(12) United States Patent
Chen et al.

(10) Patent No.: US 11,424,665 B2
(45) Date of Patent: Aug. 23, 2022

(54) APPARATUS FOR ASSEMBLING A PERMANENT MAGNET MOTOR ROTOR

(71) Applicant: TECO Electric & Machinery Co., Ltd., Taipei (TW)

(72) Inventors: Ming-Hsiang Chen, Taipei (TW); Po-Ju Huang, Taipei (TW); Lian-Shin Hung, Taipei (TW)

(73) Assignee: TECO ELECTRIC & MACHINERY CO., LTD., Taipei (TW)

( * ) Notice: Subject to any disclaimer, the term of this patent is extended or adjusted under 35 U.S.C. 154(b) by 112 days.

(21) Appl. No.: 16/918,645

(22) Filed: Jul. 1, 2020

(65) Prior Publication Data
US 2021/0006138 A1    Jan. 7, 2021

(30) Foreign Application Priority Data
Jul. 2, 2019   (TW) .................................. 108123296

(51) Int. Cl.
*H02K 15/00*   (2006.01)
*H02K 15/03*   (2006.01)
*H02K 1/27*    (2022.01)

(52) U.S. Cl.
CPC ............. *H02K 15/03* (2013.01); *H02K 1/27* (2013.01); *Y10T 29/53143* (2015.01)

(58) Field of Classification Search
CPC .......... H02K 37/14; H02K 15/03; H02K 1/27; F16C 2380/26; Y10T 29/49009; Y10T 29/49012; Y10T 29/53143; Y10T 29/49075; Y10T 29/53
USPC ......... 29/732, 428, 598, 607, 729, 738, 757, 29/787
See application file for complete search history.

(56) References Cited

U.S. PATENT DOCUMENTS 6,211,587 B1 * 4/2001 Enomoto .................. H02K 5/18
                                                     310/410
8,067,872 B2 * 11/2011 Pedersen .............. H02K 1/2773
                                                   310/156.53

* cited by examiner

*Primary Examiner* — Thiem D Phan
(74) *Attorney, Agent, or Firm* — Muncy, Geissler, Olds & Lowe, P.C.

(57) ABSTRACT

An apparatus for assembling a permanent magnet motor rotor includes a first-end positioning assembly, a plurality of connectors, and a second-end positioning assembly. The first-end positioning assembly is utilized to fix a first-end rotor core. The second-end positioning assembly is utilized to fix a second-end rotor core. The connectors are utilized to connect and fix the first-end positioning assembly with the second-end positioning assembly. Each first longitudinal axis of each first positioning element of the first end positioning assembly is different from each second longitudinal axis of each second positioning element of the second end positioning assembly. In addition, a method for assembling a permanent magnet motor rotor is also provided.

8 Claims, 12 Drawing Sheets

APPARATUS FOR ASSEMBLING A PERMANENT MAGNET MOTOR ROTOR

This application claims the benefit of Taiwan Patent Application Serial No. 108123296, filed Jul. 2, 2019, the subject matter of which is incorporated herein by reference.

BACKGROUND OF THE INVENTION

(1) Field of the Invention

The invention relates to an assembling apparatus and a method thereof, and more particularly to an apparatus for assembling a permanent magnet motor rotor and a method thereof.

(2) Description of the Prior Art

In order to reduce cogging torque of a permanent magnet motor, a rotor core is usually formed in sections, and neighboring sections of the rotor core are differed in an angle with respective to a common central axis, such that the cogging torques of adjacent sections of the rotor core would be close but canceled to each other. Thereupon, the entire cogging torque would be substantially reduced.

Figure 1:
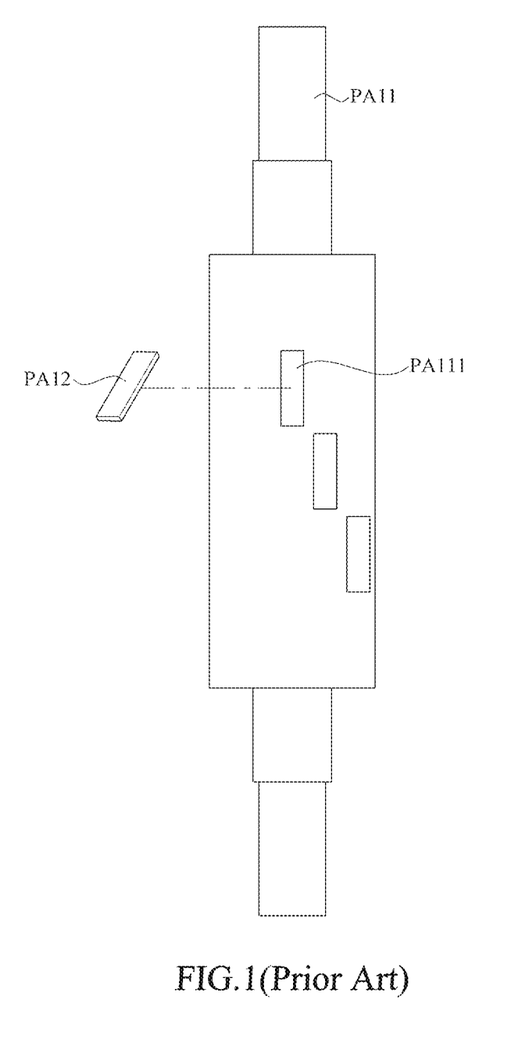
FIG. 1 is a schematic view of a rotation shaft and a key plate in the art.
Figure 2:
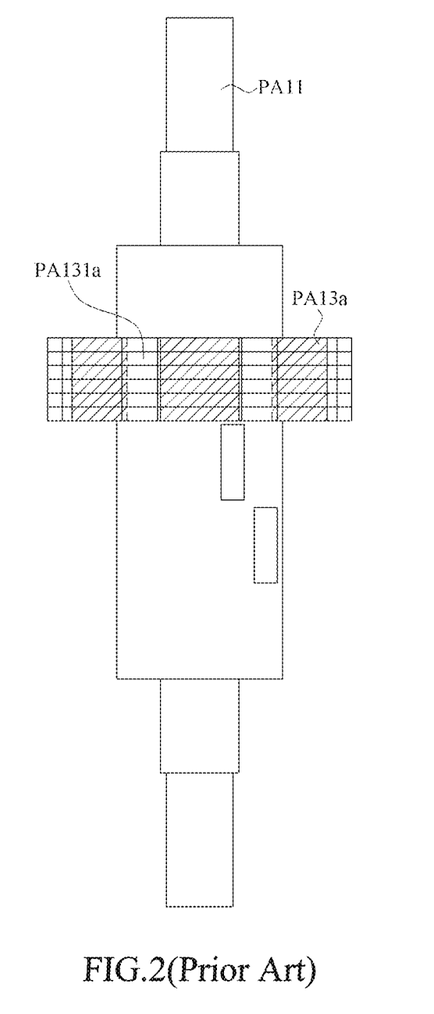
FIG. 2 demonstrates schematically the rotation shaft of FIG. 1 mounted with a first rotor core in the art.
Figure 3:
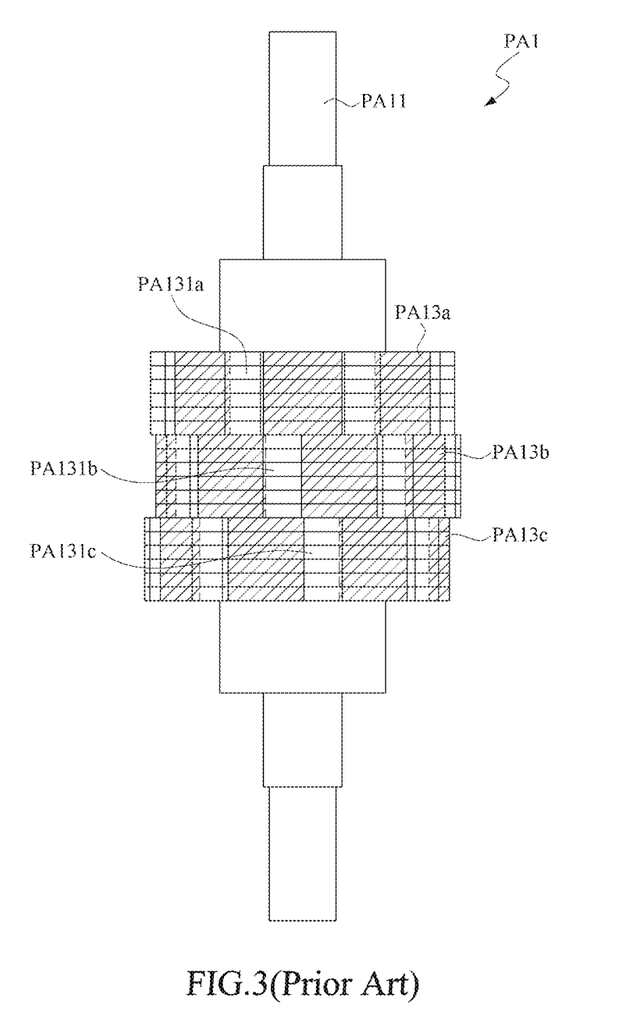
FIG. 3 demonstrates schematically the rotation shaft of FIG. 1 mounted with a sectional skewed rotor assembly in the art.

Refer to FIG. 1 through FIG. 3; where FIG. 1 is a schematic view of a rotation shaft and a key plate in the art, FIG. 2 demonstrates schematically the rotation shaft of FIG. 1 mounted with a first rotor core in the art, and FIG. 3 demonstrates schematically the rotation shaft of FIG. 1 mounted with a sectional skewed rotor assembly in the art. As shown, the sectional skewed rotor assembly PA1 includes a rotation shaft PA11, a plurality of key plates PA12 (only one labeled in the figure) and a plurality of rotor cores PA13a, PA13b, PA13c.

The rotation shaft PA11 is furnished with a plurality of key ways PA111 (only one labeled in the figure), and each of the key ways PA111 is arranged at an individual angle. The key plates PA12 are mounted into the corresponding key ways PA111. In each of the rotor cores PA13a, PA13b, PA13c, a plurality of rotor grooves PA131a, PA131b, PA131c are furnished to corresponding peripheral surfaces thereof, respectively, and a plurality of buckling slots (not shown in the figure) are furnished to corresponding inner surfaces thereof at places respective to the key plates PA12, in which the buckling slot is used for buckle the corresponding key plate PA12.

In a typical manufacturing process, the first key plate PA12 is fitted into the corresponding first key way PA111, and the rotation shaft PA11 is plugged into the rotor core PA13a. Then, the second key plate PA12 is fitted into the second key way PA111, and then the rotation shaft PA11 is plugged into the rotor core PA13b. Finally, the third key plate PA12 is fitted into the third key way PA111, and then the rotation shaft PA11 is plugged into the rotor core PA13c. Since these three key ways PA111 do not lie along the same vertical line, thus the rotor grooves PA131a, PA131b, PA131c would not lie along another vertical line, but form individual angles to each other. Thereupon, the sectional skewed rotor assembly PA1 is formed.

However, the aforesaid manufacturing process using the key plates PA12 and the key ways PA111 is tedious, time-consuming and costly for the inclusion of the key ways PA111 and the buckling slots. With the involvement of the key plates PA12 and the key ways PA111, the resulted rotor cores PA13a, PA13b, PA13c would be hard to be disassembled, and thus difficult to be maintained. In the case that the sectional skewed rotor assembly PA1 occurs a damage, a replacement for the whole set of the sectional skewed rotor assembly PA1 would be inevitable. Namely, any maintenance upon the rotor cores PA13a, PA13b, PA13c by separating the key plates PA12 from the corresponding key ways PA111 would be unfeasible. In addition, the construction of the buckling slots would unbalance the corresponding rotor cores PA13a, PA13b, PA13c.

SUMMARY OF THE INVENTION

In view that the conventional manufacturing process having the key plates and the paired key ways is tedious, time-consuming and costly, further that the assembled product is hard to be disassembled, investigated and maintained, and more further that the construction of the buckling slots would cause to the corresponding rotor cores to be unbalanced, accordingly it is an object of the present invention to provide an apparatus for assembling a permanent magnet motor rotor, such that at least one of the aforesaid shortcomings can be resulted.

In this invention, an apparatus for assembling a permanent magnet motor rotor, used for a rotation shaft to penetrate through and thus be assembled with a first-end rotor core and a second-end rotor core in an assembly direction, includes a first-end positioning assembly, a plurality of connectors and a second-end positioning assembly.

The first-end positioning assembly has at least one first positioning element, is furnished with a first through hole for the rotation shaft to penetrate therethrough, and is used for detachably connecting the first-end rotor core. The at least one first positioning element is used for plugging at least one of a plurality of first-rotor through holes of the first-end rotor core so as to fix the first-end rotor core. The plurality of connectors are connected with the first-end positioning assembly. The second-end positioning assembly has at least one second positioning element, furnished with a second through hole positioned in correspondence to the first through hole, and is used for detachably connecting the second-end rotor core and the plurality of connectors. The at least one second positioning element is used for plugging at least one of a plurality of second-rotor through holes of the second-end rotor core so as to fix the second-end rotor core.

In addition, a first longitudinal axis for each of the at least one first positioning element to extend individually in the assembly direction and a second longitudinal axis for each of the at least one second positioning element to extend individually in the assembly direction are arranged in an offset manner.

In one embodiment of the present invention, the at least one first positioning element includes two said first positioning elements.

In one embodiment of the present invention, the two first positioning elements are symmetrical to the first through hole and connected to form a first reference line.

In one embodiment of the present invention, the at least one second positioning element includes two said second positioning elements.

In one embodiment of the present invention, the two second positioning elements are symmetrical to the second through hole and connected to form a second reference line, and an angle is formed while the first reference line and the second reference line are projected in the assembly direction.

In one embodiment of the present invention, the apparatus for assembling a permanent magnet motor rotor further includes at least one middle positioning assembly. Each of the at least one middle positioning assembly has at least one middle positioning element, is furnished with a middle through hole positioned in correspondence to the first through hole and the second through hole, and detachably connects a middle rotor core and the plurality of connectors. The at least one middle positioning element is used for plugging at least one of a plurality of middle-rotor through holes of the middle rotor core so as to fix the middle rotor core.

In one embodiment of the present invention, the at least one middle positioning element of the at least one middle positioning assembly includes two said middle positioning element.

In one embodiment of the present invention, the two middle positioning elements are symmetrical to the middle through hole.

In another aspect of the present invention, a method for assembling a permanent magnet motor rotor, performed by utilizing the aforesaid apparatus for assembling a permanent magnet motor rotor, includes the steps of: (a) applying the first-end positioning assembly to connect the first-end rotor core and the plurality of connectors to connect the first-end positioning assembly; (b) applying the rotation shaft to penetrate through the first-end rotor core in the assembly direction; (c) applying the second-end positioning assembly to connect the second-end rotor core; (d) applying the second-end positioning assembly to connect the plurality of connectors; (e) applying the rotation shaft to penetrate through the second-end rotor core in the assembly direction; and, (f) disassembling the first-end positioning assembly from the first-end rotor core and the second-end positioning assembly from the second-end rotor core, and then the rotation shaft being assembled with the first-end rotor core and the second-end rotor core.

In one embodiment of the present invention, between the step (b) and the step (c), the method for assembling a permanent magnet motor rotor further includes the steps of: (b1) applying a middle positioning assembly to connect a middle rotor core; (b2) applying the middle positioning assembly to connect the plurality of connectors so as to have the rotation shaft to penetrate through the middle rotor core in the assembly direction and a front shaft end of the rotation shaft to expose out of the middle rotor core; and, (b3) disassembling the middle positioning assembly from the middle rotor core.

As stated above, the apparatus for assembling a permanent magnet motor rotor and the method thereof provided by this invention apply the first-end positioning assembly, the connectors and the second-end positioning assembly to mount the first-end rotor core and the second-end rotor core onto the rotation shaft without utilizing the key plates and the key ways. Thereupon, the manufacturing cost and difficulty can be reduced, and also the maintainability can be enhanced.

All these objects are achieved by the apparatus for assembling a permanent magnet motor rotor and the method thereof described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to an apparatus for assembling a permanent magnet motor rotor and a method thereof. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 4:
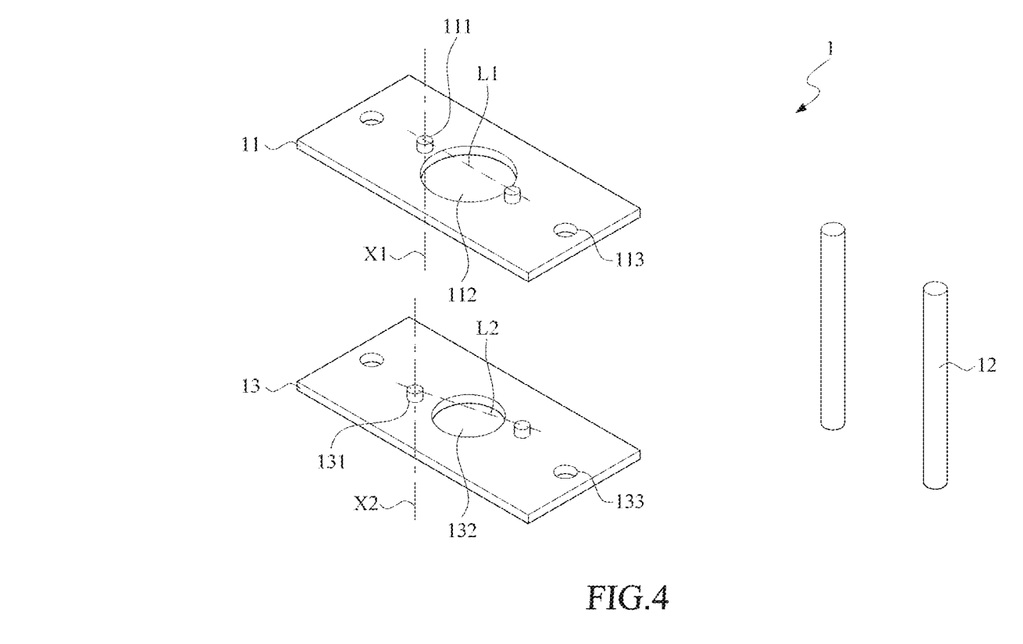
FIG. 4 is a schematic exploded view of a first embodiment of the apparatus for assembling a permanent magnet motor rotor in accordance with the present invention.
Figure 5:
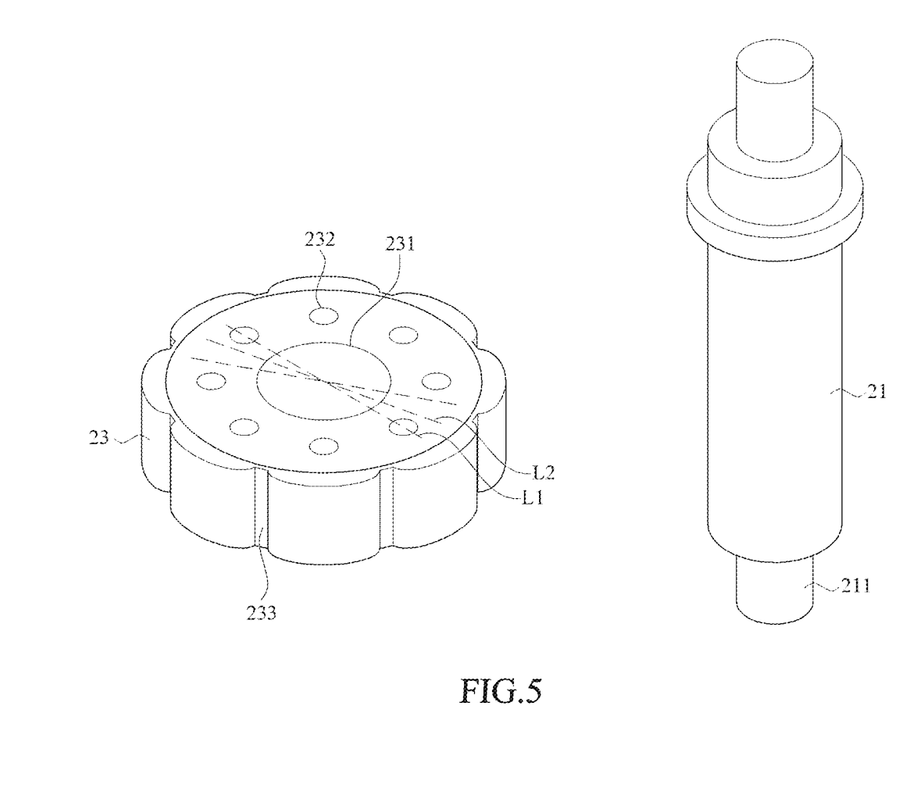
FIG. 5 demonstrates schematically perspective views of the rotation shaft and the rotor core in accordance with the present invention.

Refer to FIG. 4 through FIG. 5; where FIG. 4 is a schematic exploded view of a first embodiment of the apparatus for assembling a permanent magnet motor rotor in accordance with the present invention, and FIG. 5 demonstrates schematically perspective views of the rotation shaft and the rotor core in accordance with the present invention. As shown, the apparatus for assembling a permanent magnet motor rotor 1 includes a first-end positioning assembly 11, a plurality of connectors 12 (two shown in the figure, but with only one labeled) and a second-end positioning assembly 13.

The apparatus for assembling a permanent magnet motor rotor 1 is used for a rotation shaft 21 to penetrate therethrough along an assembly direction D (see FIG. 6) and thus to be assembled to a first-end rotor core 22 (see FIG. 6) and a second-end rotor core 23. The rotation shaft 21 has a front shaft end 211. The second-end rotor core 23 is furnished with a second-core through hole 231 for receiving the rotation shaft 21, a plurality of second-rotor through holes 232 (only one labeled in the figure) and a plurality of second rotor grooves 233 (only one labeled in the figure), in which the second rotor grooves 233 are disposed at a peripheral surface of the second-end rotor core 23. The first-end rotor core 22, structurally resembled to the second-end rotor core 23, is also furnished with a first-core through hole, a plurality of first-rotor through holes and a plurality of first rotor grooves disposed at a peripheral surface of the first-end rotor core 22.

The first-end positioning assembly 11, provided with at least one first positioning element, is furnished with a first through hole 112 for the rotation shaft 21 to penetrate therethrough, and a plurality of first positioning holes 113 corresponding to the connectors 12. In this embodiment, the first-end positioning assembly 11 has two first positioning elements 111 shaped to be cylindrical structures. The two first positioning elements 111 are used for engaging the two first-rotor through holes of the first-end rotor core 22, so as to fix the first-end rotor core 22, and to prevent the first-end rotor core 22 from displacing or rotating with respect to the first-end positioning assembly 11. A quantity of the first positioning elements 111 can be, but not limited to, one, and can be shaped to be non-circular. In addition, the first positioning elements 111 can be plugged into the corresponding first-rotor through holes, and thereby the first-end rotor core 22 can be fixed.

The second-end positioning assembly 13 is largely resembled to the first-end positioning assembly 11, but provided with a difference at positions of the second positioning elements 131. The second through hole 132 is positioned in correspondence to the first through hole 112, and the second positioning holes 133 are positioned in correspondence to the respective first positioning holes 113.

Two first longitudinal axes X1 for the two first positioning elements 111 to extend individually in the assembly direction D are separated from two corresponding second longitudinal axes X2 for the two second positioning element 131 to extend individually in the assembly direction D. Since the first positioning element 111 and the second positioning element 131 are plugged into the first-rotor through hole and the second-rotor through hole 232, respectively, and thus the first-rotor through hole and the second-rotor through hole 232 would be driven to generate offsets.

In this embodiment, the two first positioning elements 111 are symmetrical to the first through hole 112, and the two second positioning elements 131 are symmetrical to the second through hole 132. Thus, the two first positioning elements 111 can be connected to form a first reference line L1, and the two second positioning elements 131 are connected to form a second reference line L2. When the first reference line L1 and the second reference line L2 are projected in the assembly direction D onto the same plane (i.e., the second-end rotor core 23), an angle would be formed between the first reference line L1 and the second reference line L2. In particular, the angle is ranging from 1° to 45°, and it implies that the first reference line L1 and the second reference line L2 will not coincide.

Figure 6:
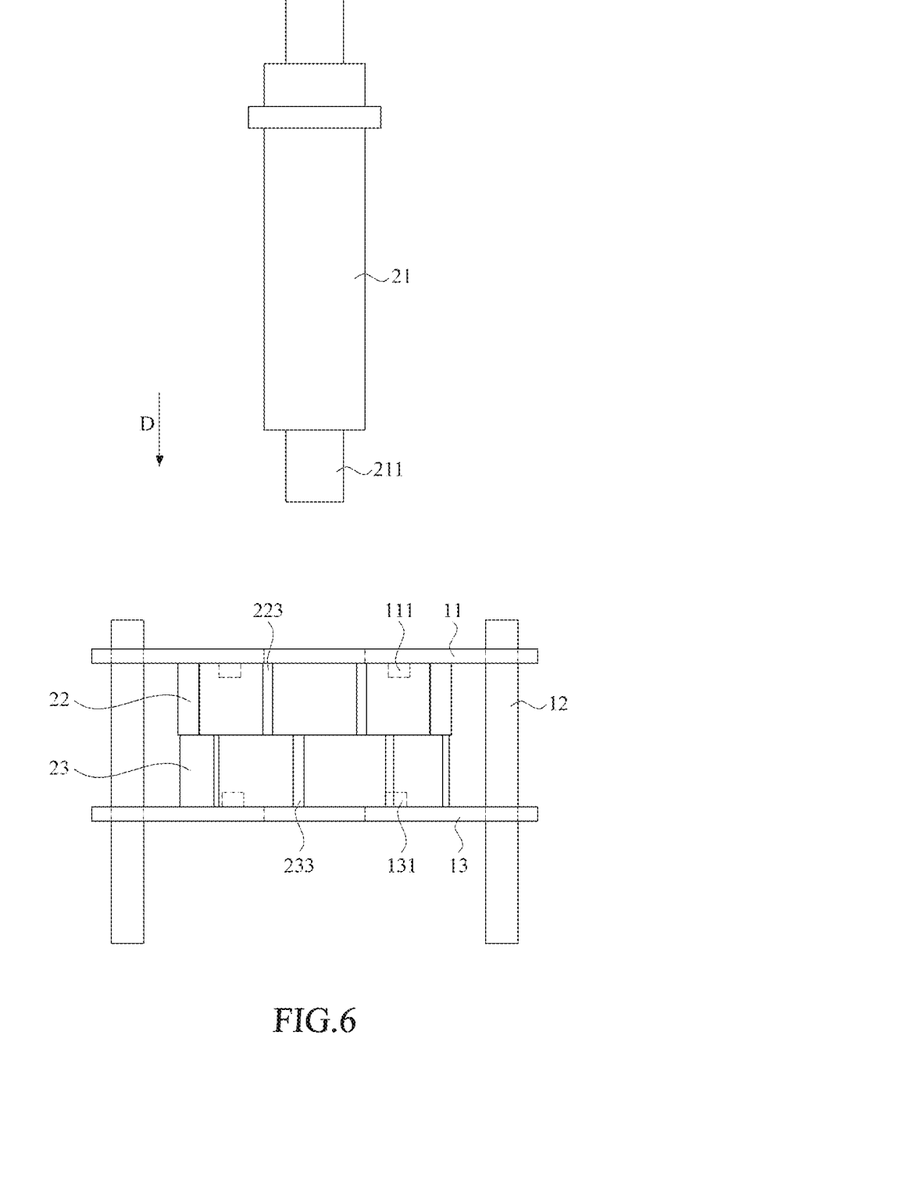
FIG. 6 demonstrates schematically an assembly process applying the first embodiment of the apparatus for assembling a permanent magnet motor rotor in accordance with the present invention.
Figure 7:
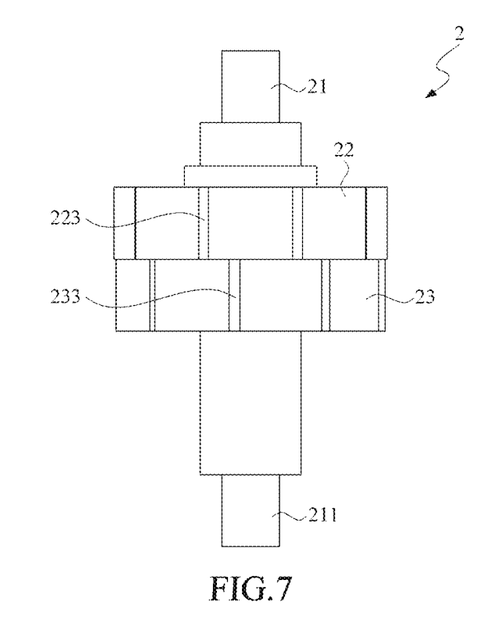
FIG. 7 is a schematic view of a sectional skewed rotor assembly assembled by the process of FIG. 6 in accordance with the present invention.

Then, refer to FIG. 4 through FIG. 7; where FIG. 6 demonstrates schematically an assembly process applying the first embodiment of the apparatus for assembling a permanent magnet motor rotor in accordance with the present invention, and FIG. 7 is a schematic view of a sectional skewed rotor assembly assembled by the process of FIG. 6 in accordance with the present invention. As shown, the first-end positioning assembly 11 is positioned onto the first-end rotor core 22, and the second-end positioning assembly 13 is positioned onto the second-end rotor core 23, while the connectors 12 connect the first-end positioning assembly 11 and the second-end positioning assembly 13 so as to ensure that no relative rotation would be generated between the first-end positioning assembly 11 and the second-end positioning assembly 13.

In this embodiment, the first-end positioning assembly 11 and the second-end positioning assembly 13 are furnished with the first positioning holes 113 and the second positioning holes 133, respectively, for the respective connectors 12 to penetrate therethrough in a tight fit. However, in some other embodiments, at least one locking element can be applied to fix the first-end positioning assembly 11 and the second-end positioning assembly 13, respectively, with the connectors 12. As such, the locking element can be a screw, a nut or a quick-release structure.

The rotation shaft 21 is to penetrate orderly the first through hole 112, the first-end rotor core 22, the second-end rotor core 23 and the second through hole 132 in the assembly direction D, and then to have the first-end rotor core 22 and the second-end rotor core 23 to be assembled together. Since the rotation shaft 21 here does not include the aforesaid key plates PA12 and key ways PA111, thus the tight fit between the rotation shaft 21 and the first-end rotor core 22 or the second-end rotor core 23 can be obtained through structural interference, gluing, knurling or other tight-fit means.

After the rotation shaft 21 is assembled to the first-end rotor core 22 and the second-end rotor core 23, a sectional skewed rotor assembly 2 is formed. As shown, the first-end rotor core 22 and the second-end rotor core 23 demonstrate different sections of this rotor assembly 2, and the first rotor grooves 223 and the second rotor grooves 233 are arranged in an offset manner.

Figure 8:
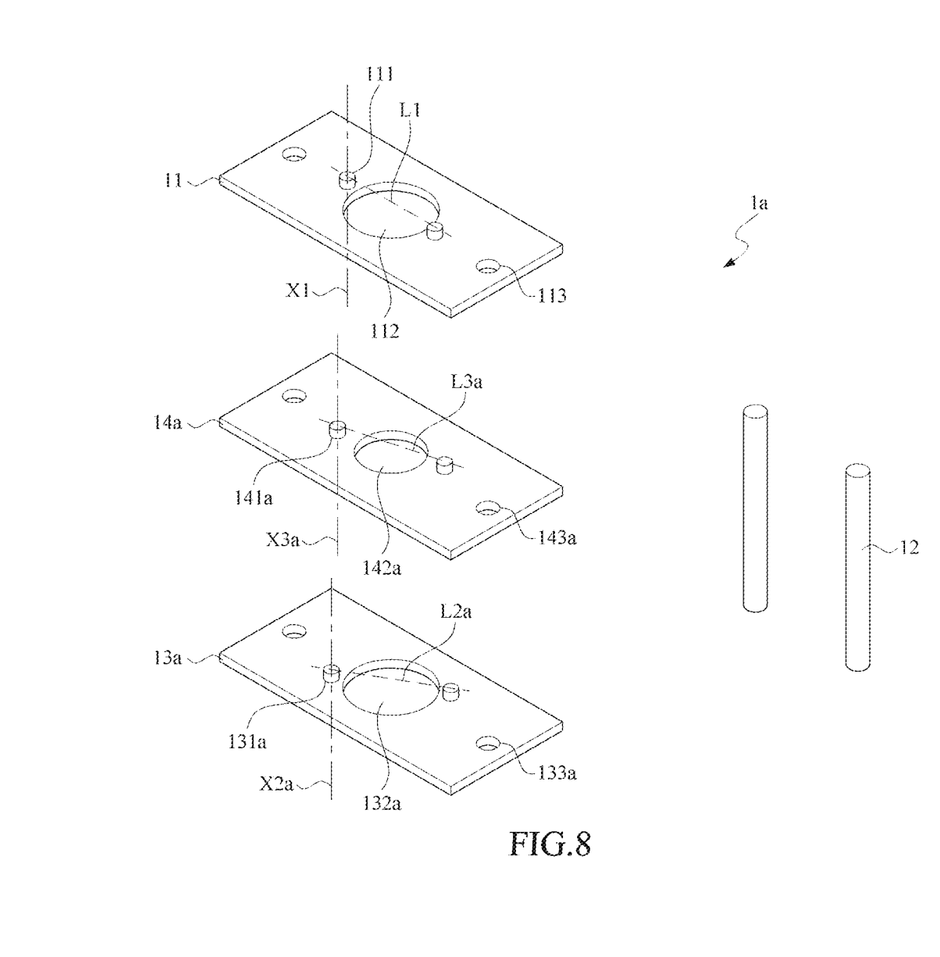
FIG. 8 is a schematic exploded view of a second embodiment of the apparatus for assembling a permanent magnet motor rotor in accordance with the present invention.
Figure 9:
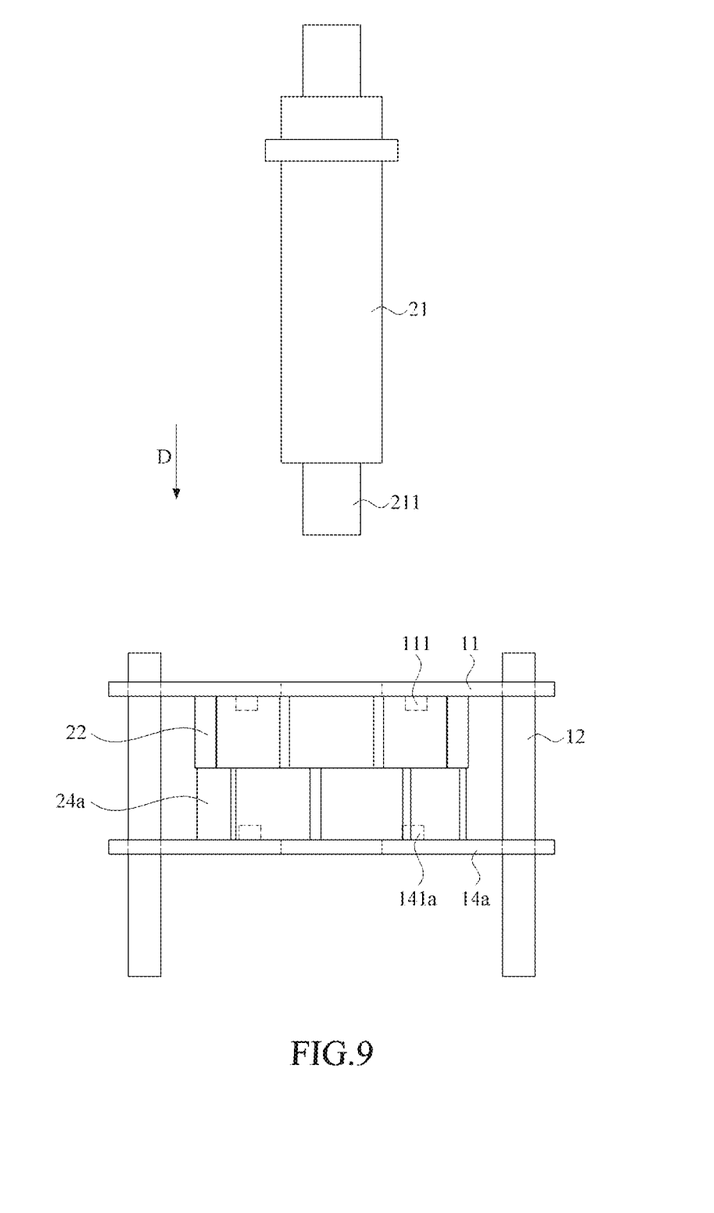
FIG. 9 to FIG. 11 demonstrate schematically an assembly process applying the second embodiment of the apparatus for assembling a permanent magnet motor rotor in accordance with the present invention.
Figure 10:
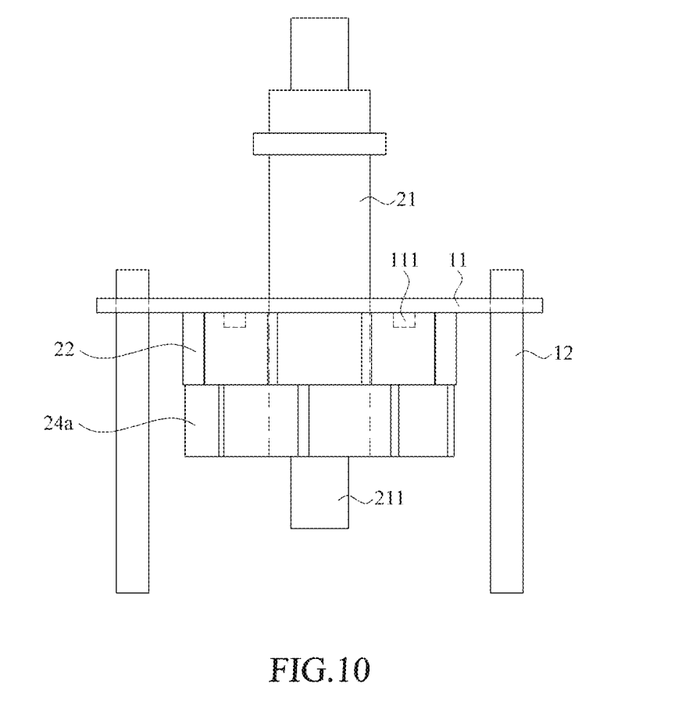
Figure 11:
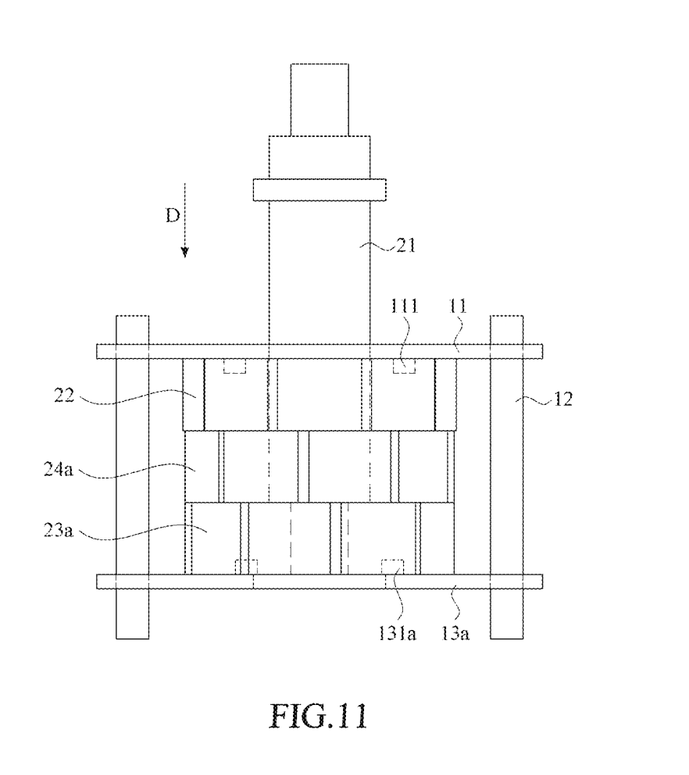
Figure 12:
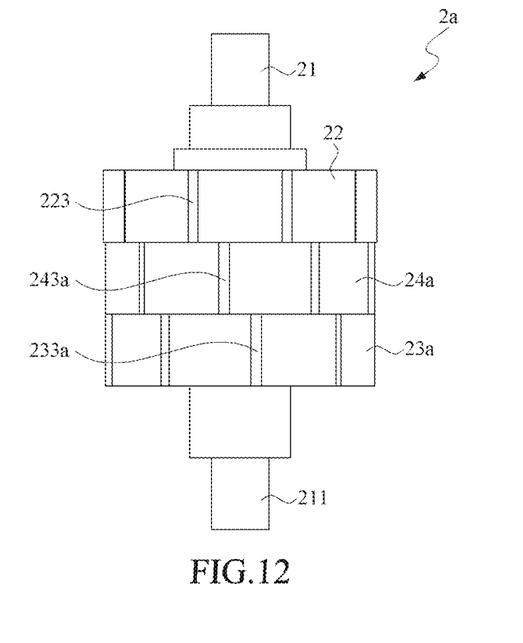
FIG. 12 is a schematic view of a sectional skewed rotor assembly assembled by the second embodiment of the apparatus for assembling a permanent magnet motor rotor in accordance with the present invention.

Finally, refer to FIG. 5, FIG. 8 through FIG. 12; where FIG. 8 is a schematic exploded view of a second embodiment of the apparatus for assembling a permanent magnet motor rotor in accordance with the present invention, FIG. 9 to FIG. 11 demonstrate schematically an assembly process applying the second embodiment of the apparatus for assembling a permanent magnet motor rotor in accordance with the present invention, and FIG. 12 is a schematic view of a sectional skewed rotor assembly assembled by the second embodiment of the apparatus for assembling a permanent magnet motor rotor in accordance with the present invention. As shown, the apparatus for assembling a permanent magnet motor rotor 1*a* includes a first-end positioning assembly 11, a plurality of connectors 12 (two shown in the figure, but with only one labeled), a second-end positioning assembly 13*a* and at least one middle positioning assembly 14*a* (one shown in the figure).

The difference between this apparatus for assembling a permanent magnet motor rotor 1*a* and the previous first embodiment of the apparatus for assembling a permanent magnet motor rotor 1 is at the second-end positioning assembly 13*a* and the middle positioning assembly 14*a* of this embodiment 1*a*, and all other elements are largely the same. Thus, details for these identical elements of the two embodiments 1, 1*a* would be omitted herein.

The second-end positioning assembly 13*a* and the first-end positioning assembly 11 are structurally similar, and the only difference in between is the position of the second positioning element 131*a*. The second through hole 132*a* is disposed in correspondence to the first through hole 112, and the second positioning hole 133*a* is disposed in correspondence to the first positioning hole 113. Similarly, the middle through hole 142*a* of the middle positioning assembly 14*a* is disposed in correspondence to the first through hole 112, and the middle positioning hole 143*a* is disposed in correspondence to the first positioning hole 113. The middle positioning assembly 14*a* is used for fixing a middle rotor core 24*a*, which is structurally resembled to the first-end rotor core 22.

Two first longitudinal axes X1 for the two first positioning elements 111 to extend individually in the assembly direction D, two second longitudinal axes X2a for the two second positioning elements 131a to extend individually in the assembly direction D, and two third longitudinal axes X3a for the two middle positioning elements 141a to extend individually in the assembly direction D are all separated to each other by offsetting.

A connection line of the two second positioning elements 131a is defined as a second reference line L2a, and that of the two middle positioning elements 141a is defined as a third reference line L3a. In this embodiment, similar to the first embodiment, when the first reference line L1, the second reference line L2a and the third reference line L3a are projected onto the same plane, angles would be formed for every two reference lines. It implies that the first reference line L1, the second reference line L2a and the third reference line L3a do not coincide to each other (as the three dashed lines shown in FIG. 5).

The first-end positioning assembly 11 fixes the first-end rotor core 22, and the middle positioning assembly 14a fixes the middle rotor core 24a, while the connectors 12 connect the first-end positioning assembly 11 and the middle positioning assembly 14a so as to ensure that no relative rotation would be generated between the first-end positioning assembly 11 and the middle positioning assembly 14a. The rotation shaft 21 is operated to penetrate through the first through hole 112, the first-end rotor core 22, the middle rotor core 24a and the middle through hole 142a orderly in the assembly direction D. It shall be explained that, in this embodiment including more than two rotor cores, only a front shaft end 211 of the rotation shaft 21 is exposed in the assembly direction D.

Then, the middle positioning assembly 14a is disassembled from the middle rotor core 24a and the connectors 12. Further, after the second-end positioning assembly 13a is fixed onto the second-end rotor core 23a by engaging the connectors 12, the second-end rotor core 23a can contact the middle rotor core 24a.

The rotation shaft 21 is operated to penetrate through the second-end rotor core 23a and the second through hole 132a orderly in the assembly direction D. After the rotation shaft 21 is assembled by penetrating to the first-end rotor core 22, the middle rotor core 24a and the second-end rotor core 23a, the first-end positioning assembly 11 and the second-end positioning assembly 13a are disassembled from the first-end rotor core 22 and the second-end rotor core 23a, respectively. As such, a sectional skewed rotor assembly 2a is formed. As shown in FIG. 12, this sectional skewed rotor assembly 2a has three sections; the first-end rotor core 22, the middle rotor core 24a and the second-end rotor core 23a. In addition, the first rotor grooves 223, the middle rotor grooves 243a and the second rotor grooves 233a are arranged in an offset manner to each other.

In this embodiment, one middle positioning assembly 14a is taken as a typical example. However, it shall be understood that plural middle positioning assemblies 14a can be also applied in accordance with the aforesaid method. In other words, this invention is not limited to the assembly having only two or three sections of rotor cores, but the assembly having more than three rotor cores can be still applied. The only requirement is that at least two of the third longitudinal axes X3a extending the corresponding middle positioning elements 141a of the middle positioning assembly 14a in the assembly direction D are offset arranged to each other. Preferably, all the first longitudinal axes X1, the second longitudinal axes X2a and the third longitudinal axes X3a are offset to each other. In addition, to assemble multiple rotor cores, the rotor cores that are penetrated through by the rotation shaft 21 shall be fixed by the corresponding middle positioning assemblies 14a, and thus the front shaft end 211 can be exposed. Then, by disassembling the middle positioning assemblies 14a till the rotor core penetrating the rotation shaft 21 is fixed by the second-end rotor core 23a, the final sectional skewed rotor assembly can be obtained.

It shall be explained that the basis for naming in this invention is based on the end. Referring to FIG. 4 and FIG. 8, the second-end positioning assembly 13 and the middle positioning assembly 14a are actually the same structurally. In FIG. 8, three positioning assemblies are included. Among the three positioning assemblies, the middle positioning assembly 14a is adjacent to neither the first end nor the second end. Though the middle positioning assembly 14a is structurally the same as the second-end positioning assembly 13, yet, in the second embodiment, it can only be named as the middle positioning assembly 14a, not the second-end positioning assembly 13a. Thus, no matter how many middle positioning assemblies 14a are, the positioning assembly disposed at the first end or the second end, it will be always named as the first-end positioning assembly or the second-end positioning assembly, respectively. Each of the other positioning assemblies located between the first-end positioning assembly and the second-end positioning assembly would be named as the middle positioning assembly.

In all embodiments provided in this disclosure, even though all the positioning elements (the first positioning element, the second positioning element, the middle positioning element) are offset arranged, yet the rotor cores (the first-end rotor core, the second-end rotor core, the middle rotor core) can be structurally the same.

It shall be explained that, in the embodiments of the present invention, the rotor cores are sketched according to, but not limited to, a typical surface permanent magnet (SPM) motor. In particular, this invention can be also applied to assemble the rotor cores of an interior permanent magnet (IPM) motor.

In addition, a method for assembling a permanent magnet motor rotor in accordance with the present invention is performed by utilizing the aforesaid first or second embodiment of the apparatus for assembling a permanent magnet motor rotor. This method includes the following Step S101 to Step S106.

Step S101: Apply the first-end positioning assembly to connect the first-end rotor core, and apply the plurality of connectors to connect the first-end positioning assembly and the first-end rotor core.

Step S102: Apply the rotation shaft to penetrate through the first-end rotor core in the assembly direction.

Step S103: Apply the second-end positioning assembly to connect the second-end rotor core.

Step S104: Apply the plurality of connectors to connect the second-end positioning assembly and the second-end rotor core.

Step S105: Apply the rotation shaft to penetrate through the second-end rotor core in the assembly direction.

Step S106: Disassemble the first-end positioning assembly from the first-end rotor core and the second-end positioning assembly from the second-end rotor core, such that the rotation shaft can be assembled with the first-end rotor core and the second-end rotor core.

Referring to FIG. 6 and FIG. 7, in the aforesaid Step S101 to S106, orders of the two operations in Step S101 can be switched, and also orders of the two disassembling steps in Step S106 (the first-end positioning assembly from the first-end rotor core, and the second-end positioning assembly from the second-end rotor core) can be switched. If two rotor cores are included, Step S102 and Step S105 can be integrated into a step to be performed after Step S104.

Between Step S102 and Step S103, Step S201 to Step S203 can be included.

Step S201: Apply a middle positioning assembly to connect a middle rotor core.

Step S202: Apply the plurality of connectors to connect the middle positioning assembly and the middle rotor core, such that the rotation shaft can penetrate through the first-end rotor core and the middle rotor core simultaneously in the assembly direction by having a front shaft end of the rotation shaft to expose out of the middle rotor core.

Step S203: Disassemble the middle positioning assembly from the middle rotor core.

The aforesaid Step S201 to S203 can be referred to FIG. 9 and FIG. 10.

In summary, the apparatus for assembling a permanent magnet motor rotor and the method thereof provided by this invention is to apply the first-end positioning assembly, the connectors and the second-end positioning assembly to mount the first-end rotor core and the second-end rotor core onto the rotation shaft. In comparison with the key plates and the key ways in the art, the apparatus for assembling a permanent magnet motor rotor and the method thereof of this invention can reduce the manufacturing cost and difficulty. According to this invention, the rotor core is detachable, and thus the maintainability can be enhanced. In addition, since the rotor core of this invention is furnished with no buckling slot for receiving the key plate, thus unbalance upon the rotor core can be reduced.

While the present invention has been particularly shown and described with reference to a preferred embodiment, it will be understood by those skilled in the art that various changes in form and detail may be without departing from the spirit and scope of the present invention.

What is claimed is:

1. An apparatus for assembling a permanent magnet motor rotor, used for a rotation shaft to penetrate through and thus be assembled with a first-end rotor core and a second-end rotor core in an assembly direction, comprising:
a first-end positioning assembly, having at least one first positioning element, furnished with a first through hole for the rotation shaft to penetrate therethrough, used for detachably connecting the first-end rotor core, wherein the at least one first positioning element is used for plugging at least one of a plurality of first-rotor through holes of the first-end rotor core so as to fix the first-end rotor core;
a plurality of connectors, connected with the first-end positioning assembly; and
a second-end positioning assembly, having at least one second positioning element, furnished with a second through hole positioned in correspondence to the first through hole, used for detachably connecting the second-end rotor core and the plurality of connectors, wherein the at least one second positioning element is used for plugging at least one of a plurality of second-rotor through holes of the second-end rotor core so as to fix the second-end rotor core;
wherein a first longitudinal axis for each of the at least one first positioning element to extend individually in the assembly direction and a second longitudinal axis for each of the at least one second positioning element to extend individually in the assembly direction are arranged in an offset manner.

2. The apparatus for assembling a permanent magnet motor rotor of claim 1, wherein the at least one first positioning element includes two said first positioning elements.

3. The apparatus for assembling a permanent magnet motor rotor of claim 2, wherein the two first positioning elements are symmetrical to the first through hole and connected to form a first reference line.

4. The apparatus for assembling a permanent magnet motor rotor of claim 3, wherein the at least one second positioning element includes two said second positioning elements.

5. The apparatus for assembling a permanent magnet motor rotor of claim 4, wherein the two second positioning elements are symmetrical to the second through hole and connected to form a second reference line, and an angle is formed while the first reference line and the second reference line are projected in the assembly direction.

6. The apparatus for assembling a permanent magnet motor rotor of claim 1, further including at least one middle positioning assembly, wherein each of the at least one middle positioning assembly has at least one middle positioning element, is furnished with a middle through hole positioned in correspondence to the first through hole and the second through hole, and detachably connects a middle rotor core and the plurality of connectors; wherein the at least one middle positioning element is used for plugging at least one of a plurality of middle-rotor through holes of the middle rotor core so as to fix the middle rotor core.

7. The apparatus for assembling a permanent magnet motor rotor of claim 6, wherein the at least one middle positioning element of the at least one middle positioning assembly includes two said middle positioning element.

8. The apparatus for assembling a permanent magnet motor rotor of claim 7, wherein the two middle positioning elements are symmetrical to the middle through hole.

\* \* \* \* \*